Dec. 17, 1963

J. G. KEYSER 3,114,418

METHOD OF SEALING A POROUS FORMATION
TRAVERSED BY A WELL BORE

Filed April 20, 1960

JOHN G. KEYSER
INVENTOR.

BY 3,114,418
METHOD OF SEALING A POROUS FORMATION TRAVERSED BY A WELL BORE
John G. Keyser, Box 381, Solar Heights, Mount Pleasant, Mich.
Filed Apr. 20, 1960, Ser. No. 23,565
2 Claims. (Cl. 166—29)

This invention relates to techniques used in drilling oil wells. It is common practice to utilize a re-circulating fluid material in conjunction with a drilling bit to facilitate the cutting action and remove the cut material from the area surrounding the tool. It is necessary that a circulation of this fluid be maintained in order to carry away the chips and fragments, and it is normal practice to pump the fluid down the well bore during the cutting action with sufficient pressure to bring it back up the bore in a surrounding annular conduit. This cutting compound is commonly referred to as "mud," and much research has been devoted to establishing its proper consistency, viscosity, and other characteristics.

A severe problem is encountered when a well bore enters a porous fragmented area which will not contain the liquid pressure necessary to drive the cutting compound back up the length of the well bore. In such formation, the cutting compound migrates out into the formation rather than performing its necessary function of carrying the chips and fragments away from the cutting tool. It is vital that some arrangement be provided for sealing off the formation so that the recirculation of the cutting compound can be re-established. Several attempts have been made at sealing off the formation where it is traversed by the well bore, but none of these known to applicant have been more than partially successful. It has been determined with certainty, however, that a technique embodying this invention is capable of sealing off porous formations under extremely adverse conditions.

According to the preferred procedure embodying this invention, a solution of calcium chloride is pumped down into the porous formation for two purposes. The first of these is to clean the surfaces of the formation to prepare them for adhering to a charge of cement which is later injected. The second purpose is to establish an environment which will facilitate a rapid setting of the cement after it has been injected. The amount of the calcium chloride which is injected will be determined by the nature of the formation and by the amount of it that has been exposed by the well bore.

After the conditioning by the calcium chloride, a charge of liquid cement is pumped into the bore under considerable pressure, and it flows out into the openings and passages in the formation. The cement has been preferably prepared with an accelerating addition of calcium chloride which will cause the cement to set at an extremely rapid rate. This characteristic tends to prevent the cement from continuing to drift off into the formation. A cement with a calcium chloride addition of as much as twenty-five percent has been effectively used in practicing this invention.

It is important that the bottom of the conduit through which the cement has been piped be sealed off during the period in which the cement is hardening. It is desirable to seal the area not only against back pressure tending to move the cement back out of the formation toward the well bore, but also to prevent further pressure down the bore which would tend to disturb the "set" of the cement in the formation. An arrangement for accomplishing this is illustrated in the accompanying drawing, in which:

FIGURE 1 presents a schematic illustration showing a well bore with a device for controlling the flow of the cement.

Figure 1:
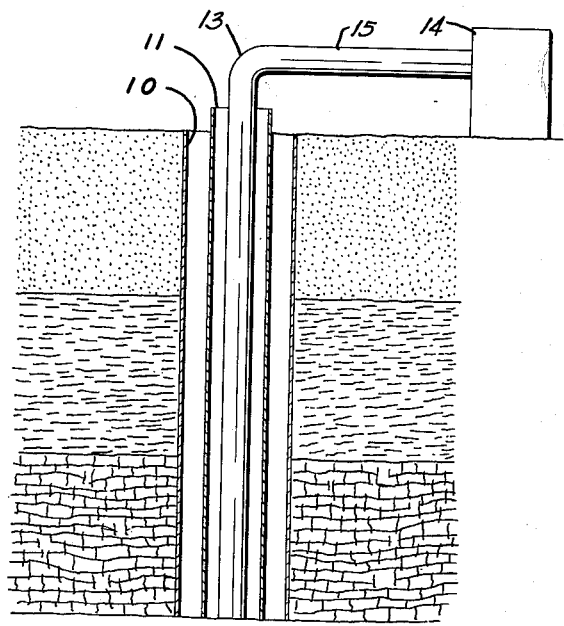

Referring to the drawing, the well bore is shown defined by the outer casing 10 which extends down into the various strata a predetermined amount according to local practices and conditions. An inner casing 11 defines the lower extremity of the well bore, and the working drill rod (not shown) normally operates within it.

Figure 2:
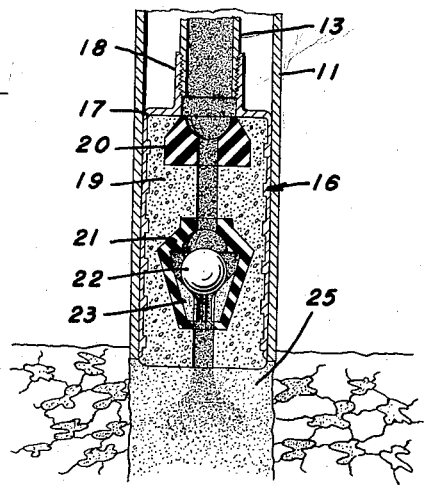
FIGURE 2 is on an enlarged scale from that of FIGURE 1, and shows the discharge of the cement into the formation.
Figure 3:
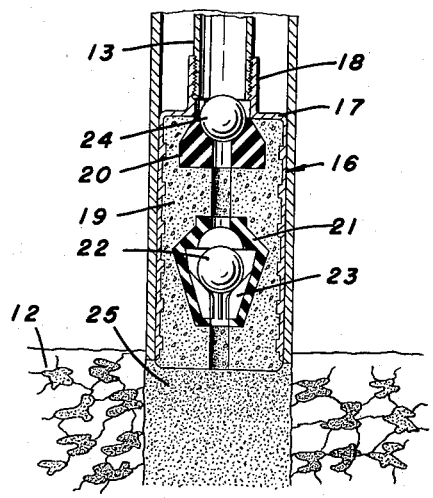
FIGURE 3 shows the condition of the device after the cement has been properly projected into the formation.

When the well bore enters a fragmented porous formation such as is indicated at 12, the pipe 13 is connected to a cementing pump 14 by the horizontal extension 15, and the porous strata is conditioned by calcium chloride as described previously. The flow of cement at the lower extremity of the bore can be controlled through the use of the valve device indicated generally at 16, and shown in greater detail in FIGURES 2 and 3. This device includes a housing 17 having an upper extension 18 in threaded engagement with the pipe 13. The housing 17 is preferably serrated or corrugated on the inside to provide retention for the cement indicated at 19. The device 16 is completed in advance of its being inserted in the well bore, and the purpose of the cement 19 is to provide for mounting the upper valve seat 20 and the lower valve seat 21. The lower valve seat 21 prevents upward flow, and the support of the valve ball 22 on the fins 23 permits downflow to take place through this portion of the structure.

When the proper amount of concrete has been discharged into the formation, the upper ball 24 is incorporated in the fluid cement being pumped down the pipe 13. When it arrives at the upper valve seat 20, all further flow is prevented. One of the characteristics of the porous and fragmented formations of the type indicated at 12 in FIGURE 1 is that they do not have the capability of resisting the full well pressure. They are known therefore as "loss formations," and the presence of the ball 24 prevents the pressure from the head of liquid present in the pipe from disturbing the setting of the cement. The cement pumped down the well is indicated at 25, and is discharged into the formation 12 to fill the openings and crevices. After the cement has hardened, the drilling tool moves down through it as if it were part of the formation. The walls of the well bore are sealed by the cement which has moved into the formation, and it is therefore possible to maintain the circulation of the cutting fluid. The valve device 16 may either be constructed as illustrated in the drawings so that it can be withdrawn with the pipe 13, or it can be left fixed with respect to the casing 11 by a slight change in design, and drilled through because of the presence of the cement 19.

The amount of acceleration imparted to the cement by the addition of the calcium chloride must be determined according to the varying conditions encountered in a particular well. In general, the deeper the well, the less will be the proper amount of required chemical acceleration. This is due to the fact that elevated temperatures are encountered as the well depth increases, and the temperature itself has the effect of accelerating the setting of the cement. In general, it is desirable to proportion the cement so that it will set as soon as it enters the formation, without decreasing the setting time to the point where it is likely to solidify within the pipe 13 before it reaches its ultimate position in the formation.

The particular embodiments of the present invention which have been illustrated and described herein are for illustrative purposes only and are not to be considered as a limitation upon the scope of the appended claims. In these claims, it is my intent to claim the entire invention disclosed herein, except as I am limited by the prior art.

I claim:

1. A process for sealing a porous or fractured formation traversed by a well bore, said process comprising: forcing a solution of calcium chloride through a conduit within said well bore into said formation; subsequent to the application of the said calcium chloride, forcing accelerated cement through said conduit within said well bore into said formation; and maintaining a seal in said conduit carrying said cement at a point adjacent the bottom thereof in both directions during the setting of said cement.

2. A process for sealing a porous or fractured formation traversed by a well bore, said process comprising: forcing a solution of calcium chloride through a conduit within said well bore into said formation; subsequently to the application of the said calcium chloride, forcing cement through a conduit within said well bore into said formation; and maintaining a seal in said conduit carrying said cement at a point adjacent the bottom thereof during the setting of said cement.

References Cited in the file of this patent

UNITED STATES PATENTS

| | | |
|---|---|---|
| 1,452,463 | Huber | Apr. 17, 1923 |
| 2,229,177 | Kennedy et al. | Jan. 21, 1941 |
| 2,467,860 | Saurenman | Apr. 19, 1949 |
| 2,471,383 | Althouse | May 24, 1949 |
| 2,582,909 | Laurence | Jan. 15, 1952 |
| 2,612,954 | Hamilton | Oct. 7, 1952 |
| 2,868,295 | Brooks et al. | Jan. 13, 1959 |
| 2,965,171 | Howard et al. | Dec. 20, 1960 |
| 2,973,006 | Nelson | Feb. 28, 1961 |